Dec. 12, 1961 J. M. DODWELL 3,012,637
FRICTION DEVICE
Filed Dec. 26, 1956 3 Sheets-Sheet 1
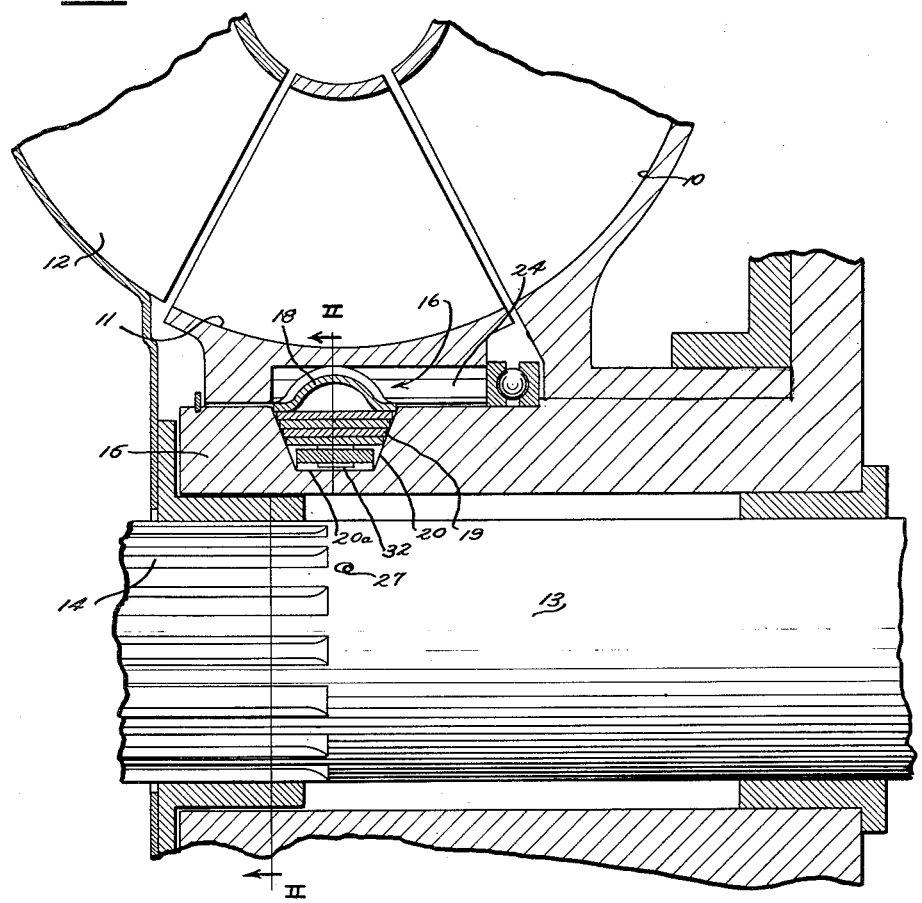
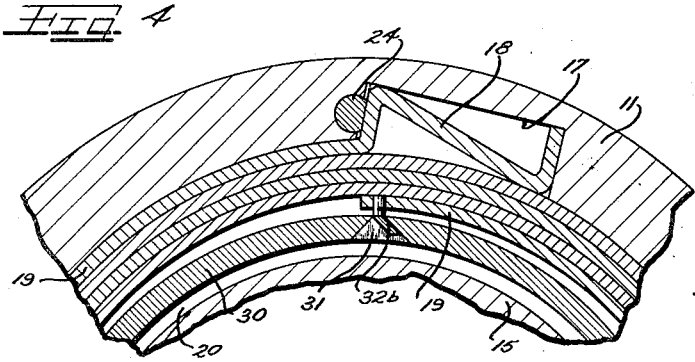
Inventor
JOHN M. DODWELL Dec. 12, 1961 J. M. DODWELL 3,012,637
FRICTION DEVICE
Filed Dec. 26, 1956 3 Sheets-Sheet 2
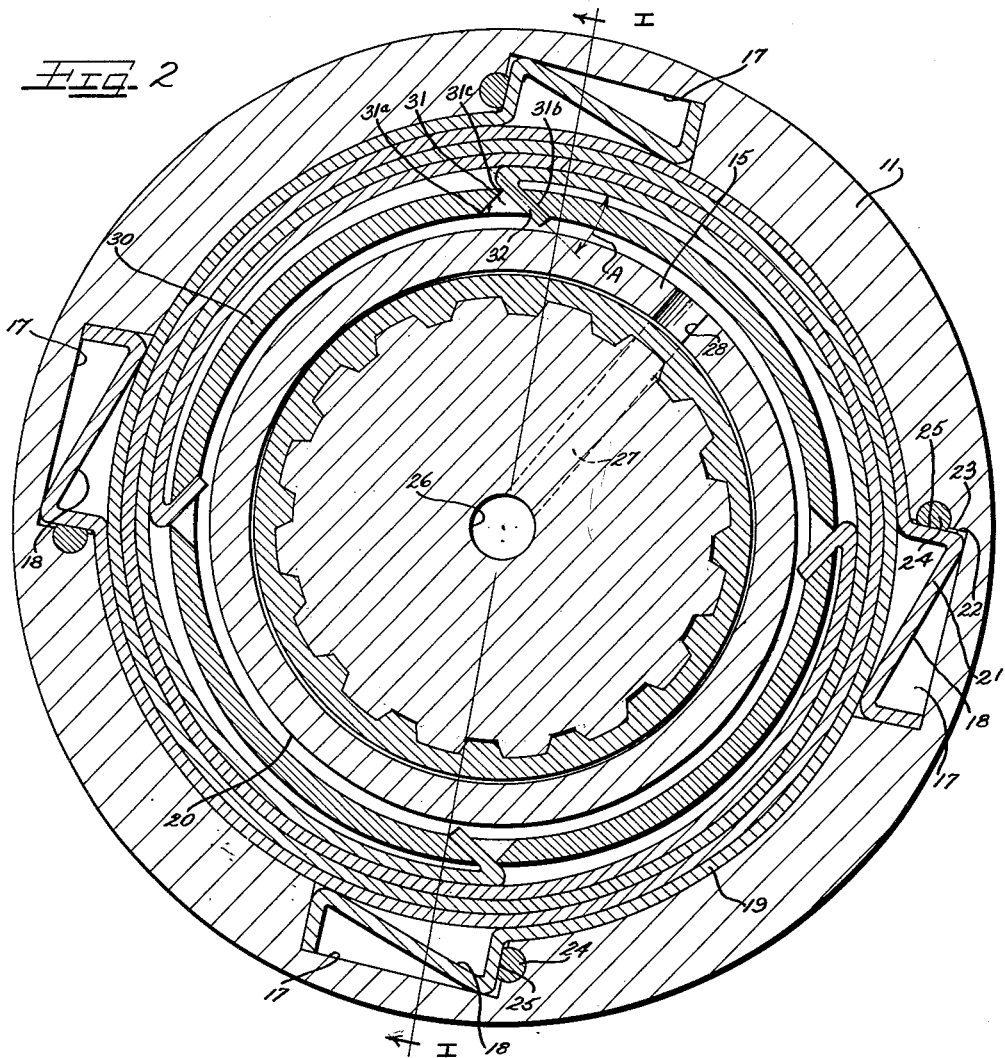
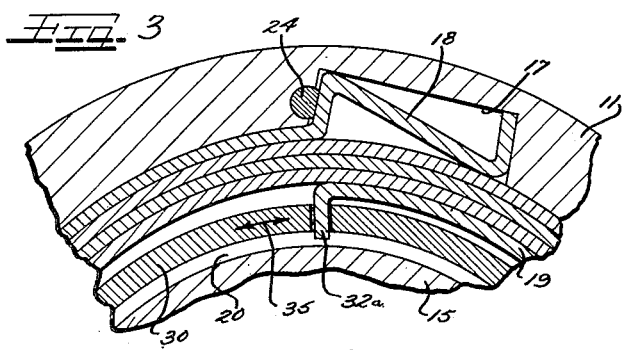
Inventor
JOHN M. DODWELL Dec. 12, 1961 J. M. DODWELL 3,012,637
FRICTION DEVICE
Filed Dec. 26, 1956 3 Sheets-Sheet 3
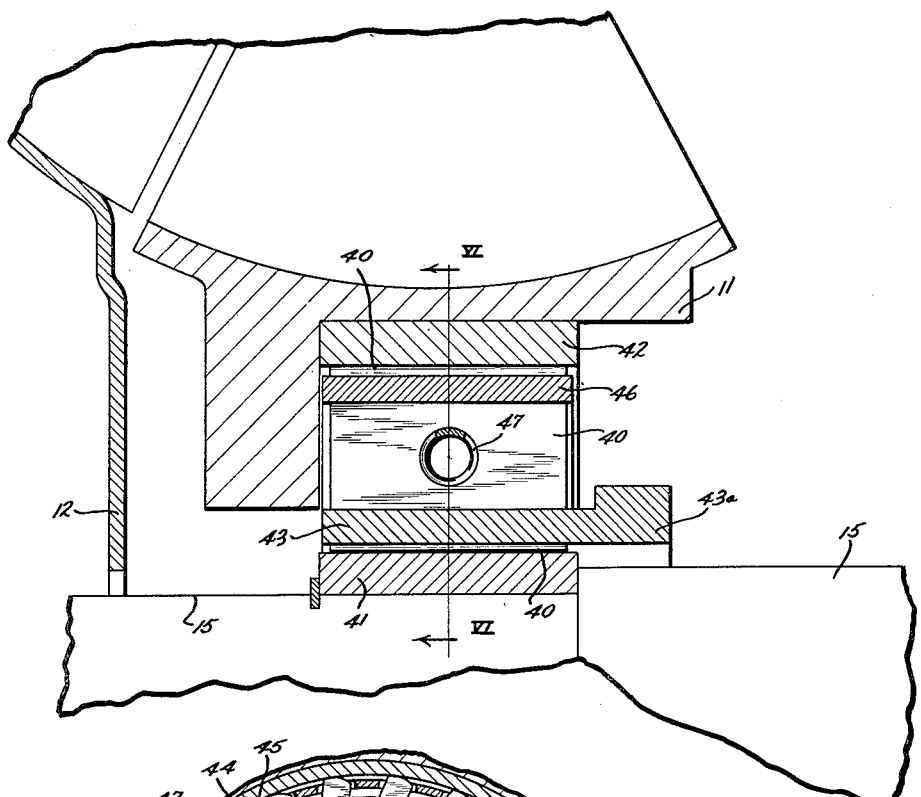
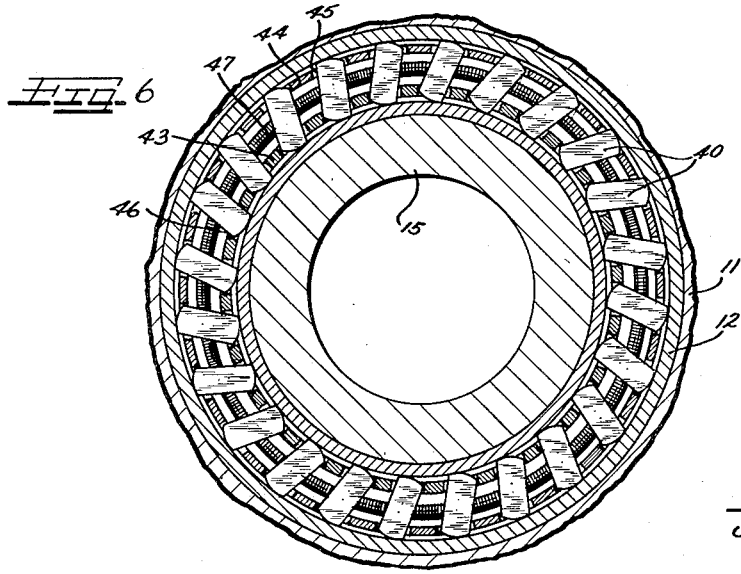
Inventor
JOHN M. DODWELL
By Hill, Sherman, Meroni, Gross & Simpson Attys United States Patent Office 3,012,637
Patented Dec. 12, 1961

3,012,637
FRICTION DEVICE
John M. Dodwell, Piedmont, Quebec, Canada
Filed Dec. 26, 1956, Ser. No. 630,691
5 Claims. (Cl. 188—82.6)

The present invention relates to overrunning or one-way devices and is, more particularly, concerned with an improved overrunning device employing automatic means for preventing any reverse rotation between the relatively rotating members thereof when the driving torque therebetween is reversed.

As those familiar with the art of overrunning, or one-way, friction devices are aware, the stresses imposed upon the members may reach dangerously high level upon reverse rotation of the parts if reverse rotation is permitted for a short period of time and the device grabs after the reverse rotation has been permitted. Grabbing action is particularly injurious to one-way devices such as those employing sprags or other wedge-type friction means. The sprag races or wedge surfaces of such devices actually become dented or Brinneled as a result of such impact shock action, and after a series of indentations have resulted the action of the device becomes erratic and the tendency toward further indentation and wear increases. In constant use, one-way devices capable of permitting such an impact shock upon reverse action have proved unsatisfactory from the maintenance point of view and many efforts have been made by those working in the field to provide an overrunning device in which grabbing or high shock engagement are eliminated. One important, and relatively recent, use for a heavy duty and yet extremely long-lived overrunning device is at the connection between the stator and the housing of the modern hydraulic torque converter transmission. In these transmission drives a fluid coupling of the Fottinger type is employed having a driving rotor, a driven rotor, and a stator element positioned therebetween in the fluid flow path. At such time as the stator is overrunning and the automotive accelerator pedal is depressed rapidly to obtain a surge of power, the stator of the transmission stops and attempts to reverse. If the overrunning device does not immediately engage to prevent any reverse rotation whatever of the stator, engagement of the device subsequent to an initiation of reverse movement causes a tremendous impact stress on the overrunning device members. These impact stresses, above discussed, are very injurious to the device, and it has been found that the over-all useful life of conventional devices in this type of heavy duty use is short.

In accordance with the principles of the present invention, means are provided for automatically insuring instantaneous energization of the one-way or overrunning device when the device component decelerates to stop, and immediately prior to attempted reverse action. In accordance with the principles of the present invention, this positive energization of the device is accomplished through the provision of an inertia member arranged for rotation with the stator element when that element is in motion. The inertia member is connected to the wedging or clutching elements of the overrunning device to provide a positive force against the clutching surfaces thereof to force those surfaces into clutching engagement upon a deceleration of the stator.

In the instant application, two embodiments of the invention are illustrated, both employing the principles of the present invention. In the first embodiment a sprag type overrunning device is provided with an inertia ring operatively associated with the radially inner edges of the sprag elements to force the inner edges against the relatively fixed inner device race upon deceleration and stopping of the stator element. In the second embodiment a V-band device is constructed with an inertia ring positioned in the V-groove thereof inwardly of the innermost V-band such that inertia forces exerted on the ring cause movement of bands deeper into the V-groove of the device upon deceleration of the stator prior to reverse action thereof. It will be appreciated that other modifications will be apparent to those skilled in the art.

It will, accordingly, be understood that an object of the present invention is to provide a positively energized overrunning device capable of substantially instantaneous clutching action upon attempted reverse rotation of the device part.

Yet another object of the present invention is to provide an overrunning device constructed to permit relative rotation between the clutching parts in one direction and to lock up by positive action upon stopping of such rotation immediately prior to an attempt to rotate the parts in a reverse direction.

Still other and further objects and features of the present invention will at once become apparent to those skilled in the art from a consideration of the attached drawings wherein the two embodiments of the present invention are shown by way of illustration only and wherein:

FIGURE 1 is a view, in cross-section, of a device constructed in accordance with the principles of the present invention as employed in a vehicle transmission;

FIGURE 2 is a cross-sectional view of the device components taken along the line II—II of FIGURE 1;

FIGURE 3 is a fragmentary view of the device shown in FIGURE 2 with a slight modification thereto;

FIGURE 4 is still a further modified form of the device shown in FIGURE 2;

FIGURE 5 is a fragmental view, in cross-section, of a vehicle transmission employing a modified form of the present invention; and FIGURE 6 is a view, in cross-section, taken along the line VI—VI of FIGURE 5.

As shown on the drawings:

As may be seen from a consideration of FIGURES 1 and 2 of the drawings the device of the present invention is particularly adapted to utilization in vehicular power transmission systems. In the structure illustrated, a conventional automotive torque converter of the hydraulic type is illustrated. A driving rotor 10 operates in cooperation with an overrunning stator element 11 to drive an output or driven rotor 12 which is in turn secured to an output shaft 13 via the spline connection 14. The overrunning stator 11 is mounted for rotation on the hollow stub shaft 15 which is fixedly secured to the vehicle transmission housing. A device generally indicated at 16 is positioned between the stator 11 and the fixed shaft member 15 for permitting rotation of the stator in one direction but preventing its rotation in the opposite direction. In the particular arrangement shown rotation of the stator 11 is permitted in the counterclockwise direction as viewed in FIGURE 2 and rotation in the clockwise direction as viewed in that figure is prevented.

In the form of the invention illustrated in FIGURES 1 and 2, the stator 11 is provided with a plurality of generally radially outwardly extending pockets 17 in which the retaining keys 18 of the spiral bands 19 are positioned. The positioning of the spiral bands is such as to permit their radially inner ends to lie within the confines of a V-groove 20 in the fixed shaft 15, for wedging contact by the individual bands with the sidewalls of the V-groove when reverse rotation of the stator element 11 is attempted. The general construction of the bands 19, as well as the pockets 17, of the present invention is described in my previous copending United States patent application Serial No. 508,654, filed May 16, 1955. Thus, the locking portions 18 of respective bands are constructed with an outwardly projecting raised dimple 21 having a forwardly facing surface 22 for retaining cooperation with the wall 23 of the respective pockets 17. The dimpled nature of the band is more clearly seen from a consideration of FIGURE 1 at 18 and in order to distribute the forces applied by the locking portion 18 against the side wall 23, a pin 24 of hardened steel, or the like, is provided. The pin 24 sits within a segmental bore 25 and is rockable about its longitudinal axis which is essentially parallel to the axis of rotation of the stator 11. As a result of this arrangement, the forces applied by the dimple locking portion 13 are spread over a relatively large force receiving surface in the stator 11 which may, under the circumstances, be constructed of aluminum or other similar alloy without fear of damage thereto by the large forces applied to the bands 19 upon attempted reverse rotation of the parts. The rocking movement of the pins 24 permits perfect alignment of the force transmitting surface 22 of the band with the force receiving surface 25 of the pin 24 thereby assuring minimization of the stress concentration between the individual band and its retaining socket 17. This rocking movement of the pin 24 about an axis generally parallel to the axis of rotation of the device is clearly described and set forth in my above mentioned previous copending application Serial No. 508,654, filed May 16, 1955, and may, if it is considered desirable in extremely heavy duty uses, include a provision of arcuate surfaces on the surfaces 22 and 25 to permit alignment of the individual band not only relative to an axis parallel to the axis of rotation of the stator but also relative to an axis transverse to the axis of the stator.

As thus far described, the above device is similar to that described and claimed in my above identified copending application, Serial No. 508,654, filed May 16, 1955, and illustrated specifically in FIGURE 7 thereof. In accordance with the principles of the present invention, positive means are provided for energizing the overrunning device substantially instantaneously with discontinuance of rotation of the stator in its overrunning direction. Thus, where in some uses it has been found that the stator would reverse a very small fraction of a revolution before energization of the overrunning device to prevent further rotation occurred in the embodiment of the invention shown in the above identified copending application and in other transmissions employing various forms of previously known overrunning devices, the device of the present invention positively precludes any such partial reverse rotation.

Positive energization is accomplished in the present invention through the provision of an inertia member operatively connected to the innermost ends of the torque transmitting bands 19. The inertia member, indicated at 30 loosely floats in the V-groove 20 between the torque transmitting bands 19 and the bottom surface 20a of the V-groove. In the form shown in FIGURES 1 and 2, the inertia member comprises a ring provided with a plurality of apertures 31 which cooperate with downturned fingers 32 on the ends of the respective band 19. When the stator member 11 tends to overrun, namely when the member 11 rotates in the counterclockwise direction as viewed in FIGURE 2 relative to the fixed shaft 15, the ring 30 will be rotated with the bands 19 as a result of the cooperation of the apertures with the downturned fingers 32. Should a force be applied to stator as a result of acceleration, or other action, applied to the stator blading, an almost instantaneous reversal of the stator member is attempted. Such reversal requires, of course, that the stator be brought to an abrupt stop. In the present invention this abrupt stop is, of course, applied to the torque transmitting bands 19 by means of the locking portions 18 thereof. However, the inertia of the ring 30 tends to prevent its immediate stopping and it will tend to continue its rotation in the counterclockwise direction. Continued rotation of the rings 30 relative to the bands 19 will require that the fingers 32 at the ends of the band move counterclockwise relative to the stator member 11 thereby tending to wind the torque transmitting bands 19 deeper into the V-groove in the fixed shaft 15. This winding action requires that the bands contact the walls of the V-groove tightly and as a result of this winding action the bands 19 are fully engaged with the walls of the V-groove for clutching action instantaneously with the stopping of the counterclockwise rotation of the stator member 11 and before reverse rotation of the stator can occur. As a result of this positive energization of the bands 19 upon deceleration of the stator member 11 in its counterclockwise direction of rotation, it has been found that the stator does not rotate a partial turn in the clockwise direction upon changes in the direction of the rotational forces applied to the stator and, further, that the torque loads applied to the bands 19 are accordingly substantially reduced through the elimination of the impact inherently accompanying the application of a clutching force after a partial revolution of the stator member in its clockwise direction has occurred. As a result of this minimization of impact loads on the torque-transmitting bands 19, the longevity of the device has been substantially improved and in installations requiring a minimum of weight and space, clutch bands and the remaining components may be reduced in size without falling below the torque-carrying capacity of the overrunning clutches previously used.

In the specific embodiment of the invention shown in FIGURES 1 and 2, the fingers 32 of the individual bands 19 are turned back upon the band at an angle A and the apertures 31 in the ring 30 are likewise provided with angled sides, as at 31a and 31b. As a result of this inclination, rotation of the ring 30 in a counterclockwise direction relative to the stator member 11, which would occur, as above noted, upon deceleration of the stator 11, positively cams the end of the individual band 19 radially inwardly at the same time that the generally tangential pull against the end of the band is applied. This provides a particularly positive energizing contact of the bands with the V-groove walls. At the same time, when the stator element is started up again in its counterclockwise direction of rotation relative to the fixed shaft 15, the floating inertia ring 30 will tend to start slowly and will tend to hold the fingers 32 against rotation with the stator 11. This action will cause the bands 19 to unwrap rapidly to thereby free the device in an unusually rapid manner. The inclined finger 32 also cooperates with the corner 31c of the aperture 31 to cam the finger 31 in the associated end of the individual torque-transmitting band 19 radially outwardly upon initiation of counterclockwise rotation of the stator 11. Thus, it will be seen that the inertia ring 30 provides a positive force application to the innermost ends of the respective torque transmitting bands through a tangential wrapping force as well as a radial camming force. When the stator 11 is decelerated, while traveling in the counterclockwise direction relative to the fixed shaft 15, the ring 30 provides a tangential force at the fingers 32 tending to wind the bands tighter into the V-groove, and at the same time positively cams the ends 32 of the bands deeper into the V-groove. Conversely, when the stator 11 accelerates relative to the fixed shaft 15, the inertia ring 30 will apply a tangential force tending to expand the bands and, at the same time, the inertia ring 30 will cam the fingers 32 radially outwardly to assure instantaneous disengagement of the bands from the sidewalls of the V-groove.

As shown, the apertures 31 act as lubricant pumps to force oil from conduit 26 to the bands 19 via ports 27 and 28.

While it is, of course, desirable that both the camming and wrapping functions above described relative to the cooperation of the apertures 31 with the fingers 32, be employed, the tangential application of force is ordinarily sufficient in and of itself to provide satisfactory energizing operation. Such an arrangement is shown in FIGURE 3 wherein the radially inwardly projecting fingers 32a on the bands 19 are not turned back upon the respective band 19 but are, instead generally perpendicular to the end thereof. In such a construction, relative movement of the ring 30 relative to the stator 11 in the direction as shown by the arrow 35, will cause a tangential force application to the fingers 32a tending to wind or unwind the band 19 without additional camming action.

Another form of connection between the individual bands 19 and the inertia ring 30 may be seen from a consideration of FIGURE 4. As there shown, a pin 32b is rigidly secured to the inner end of the respective bands 19 and cooperates with the aperture 31 in essentially the same manner as the generally rectangular finger 32 shown in FIGURES 1 and 2. The pin 32b may be bent backwardly in the direction of the band 19 as shown in FIGURE 4 or, if desired, may be maintained at an angle generally perpendicular to the band in the manner generally illustrated in FIGURE 3. In either event it will be obvious to those skilled in the art that the functioning of the pin 32b is essentially the same as the finger 32 or 32a.

It will be apparent to those skilled in the art that the application of the inertia ring 30 to conventional forms of sprag one-way devices and the like may be accomplished with resultant positive energization on reversal of rotation. Such an arrangement is shown in FIGURES 5 and 6 of the drawings. As is there illustrated, a sprag overrunning device employing a plurality of sprag members 40 positioned between inner and outer races 41 and 42 on the fixed shaft 15 and the stator member 11 respectively is provided with an inertia member 43. It will be seen that rotation of the stator 11 and the race 42 in the clockwise direction as viewed in FIGURE 6 is permitted but counterclockwise direction is prevented by an expanded wedging action of the individual sprag members 40. The many individual sprag members 40 are synchronized relative to each other by means of an outer control ring 44 having slots 45 therein, and the inner control ring 43 having slots 46 therein. The resilient coil spring 47 which passes through each of the individual sprag members 40 provides a force tending to maintain the sprag members 40 in an essentially radial position and thus helps to initiate the wedging action of the sprags upon reverse, or counterclockwise rotation of the stator element 11 as viewed in FIGURE 6.

In accordance with the principles of the present invention the control ring 44, positioned at the radially outer ends of the individual sprags 40 is constructed with substantially less weight than the weight of the inner control ring 43 so that the inertia of the inner control ring 43 will have a substantially greater effect than the inertia necessarily affecting the outer control ring 44. This weight differential may be assured through the utilization, if necessary, of an annular extension 43a on the ring 43, as shown in FIGURE 5.

It will be apparent that upon rotation of the stator 11, with consequent rotation of the sprag members therewith, inertia forces will be built up in the rotating mass, including the sprag members 40, the spring 47 and the control rings 44 and 43. Upon deceleration of the stator member 11 in the embodiment shown in FIGURES 5 and 6, however, the heavily weighted inner control ring 43 acts with a net inertia force to urge the radially innermost ends of the individual sprag members 40 into immediate wedging contact with the inner race 41, thereby assuring instantaneous energization upon attempted reverse rotation of the parts.

It may be seen that I have provided a novel and substantially improved overrunning device construction wherein inertia forces generated in the overrunning operation of the device are utilized for supplying an energizing force upon deceleration of the overrunning member immediately prior to any attempt to reverse its direction of rotation.

It will be apparent to those skilled in the art that variations and modifications may be made in accordance with the principles of the present invention without departing from the scope of the novel concepts thereof and, accordingly, it is my intention that the present invention be limited solely by the scope of the hereinafter appended claims.

I claim as my invention:

1. An overrunning device comprising a fixed member having an annular V-groove therein, a member mounted for rotation relative to said member, a plurality of torque-transmitting bands secured by one end to said rotatable member and having the other end spirally wound in said annular V-groove for wrapping, wedging engagement with the walls thereof upon initiation of rotation of said rotatable member in one direction, and means secured to the said other end for moving said other end into wedging engagement in said V-groove upon deceleration of said rotatable member during rotation in the other direction, said last named means comprising an annular ring connected to said other end and rotatable about the axis of said rotatable member.

2. An overrunning device comprising a fixed member having an annular V-groove therein, a member mounted for rotation relative to said member, a plurality of torque-transmitting bands secured by one end to said rotatable member and having the other end spirally wound in said annular V-groove for wrapping, wedging engagement with the walls thereof upon initiation of rotation of said rotatable member in one direction, and means secured to the said other end for moving said other end into wedging engagement in said V-groove upon deceleration of said rotatable member during rotation in the other direction, said last named means comprising an annular ring connected to said other end and rotatable about the axis of said rotatable member and being positioned in said V-groove below said bands, and a projecting member on the tip of at least one band for cooperation with an aperture in the band whereby rotation of the ring relative to the band causes the application of a tangential force to the said other end of the band.

3. An overrunning device comprising a fixed member having an annular V-groove therein, a member mounted for rotation relative to said member, a plurality of torque-transmitting bands secured by one end to said rotatable member and having the other end spirally wound in said annular V-groove for wrapping, wedging engagement with the walls thereof upon initiation of rotation of said rotatable member in one direction, and means secured to the said other end for moving said other end into wedging engagement in said V-groove upon deceleration of said rotatable member during rotation in the other direction, said last named means comprising an annular ring connected to said other end and rotatable about the axis of said rotatable member and being positioned in said V-groove below said bands, and a projecting member on the tip of at least one band for cooperation with an aperture in the band whereby rotation of the ring relative to the band causes the application of a tangential force to the said other end of the band, and said projecting member being turned back upon said band at an acute angle to provide a radial component of force on said other end of said band when said ring rotates relative thereto.

4. In a friction device, a first member, a second member rotatable in a forward direction relative to said first member, a plurality of elements disposed between said members and arranged to be shifted in position in a certain direction to engage said first member and prevent rotation of said second member in a reverse direction relative to said first member, said elements being carried by said second member and being shifted in position in a direction opposite said certain direction upon rotation of said second member in said forward direction, and an inertia ring having means thereon engageable with said elements to activate said elements into engagement with said first member upon rotation of said inertia ring in said forward direction relative to said second member, said inertia ring and said first member having facing surfaces each being of smooth circular cylindrical form throughout, said inertia ring being carried by said elements to rotate with said second member in said forward direction whereby upon deceleration of said second member the inertia of said ring intending to maintain rotation of said ring in said forward direction produces an activating force actuating said elements toward engagement with said first member, the spacing between said surfaces and the mass of said inertia ring being sufficient to produce an activating force which is high in relation to other forces acting on said ring and said elements to rapidly and positively force said elements into engagement with said first member upon deceleration of rotation of said second member in said forward direction.

5. A device in accordance with claim 4 wherein said elements are in the form of a plurality of sprags positioned between said first and second members for wedging cooperation therewith and wherein said inertia ring is connected with the ends of said sprags adjacent the point of contact between said sprags and said first member.

References Cited in the file of this patent
UNITED STATES PATENTS

| | | |
|---|---|---|
| 2,004,650 | Collyear et al. | June 11, 1935 |
| 2,422,533, | Dodwell | June 17, 1947 |
| 2,461,217 | Lapsley et al. | Feb. 8, 1949 |
| 2,576,337 | Farkas | Nov. 27, 1951 |
| 2,603,322 | Dunn | July 15, 1952 |
| 2,685,949 | Dunlap | Aug. 10, 1954 |
| 2,803,324 | Dodge | Aug. 20, 1957 |
| 2,888,116 | Troendly et al. | May 26, 1959 |

FOREIGN PATENTS

| | | |
|---|---|---|
| 468,746 | Canada | Oct. 17, 1950 |